Jan. 11, 1949.  D. M. K. MARENDAZ  2,458,716
CLUTCH GEARING
Filed April 25, 1945  2 Sheets-Sheet 1

Jan. 11, 1949. D. M. K. MARENDAZ 2,458,716
CLUTCH GEARING
Filed April 25, 1945 2 Sheets-Sheet 2

Inventor
D. M. K. Marendaz

Patented Jan. 11, 1949

2,458,716

UNITED STATES PATENT OFFICE 2,458,716

CLUTCH GEARING

Donald Marcus Kelway Marendaz,
Bergh Apton, England

Application April 25, 1945, Serial No. 590,171
In Great Britain December 17, 1943

Section 1, Public Law 690, August 8, 1946
Patent expires December 17, 1963

3 Claims. (Cl. 74—126)

This invention relates to a clutch gearing, mainly for the conversion of reciprocating motion into rotary motion, without employing ratchet teeth engaging with pawls or detents. The main object of the invention is to provide a clutch gearing which will ensure continuous rotation and torque.

The invention is illustrated by way of example in the accompanying drawings, in which.

Figure 1:
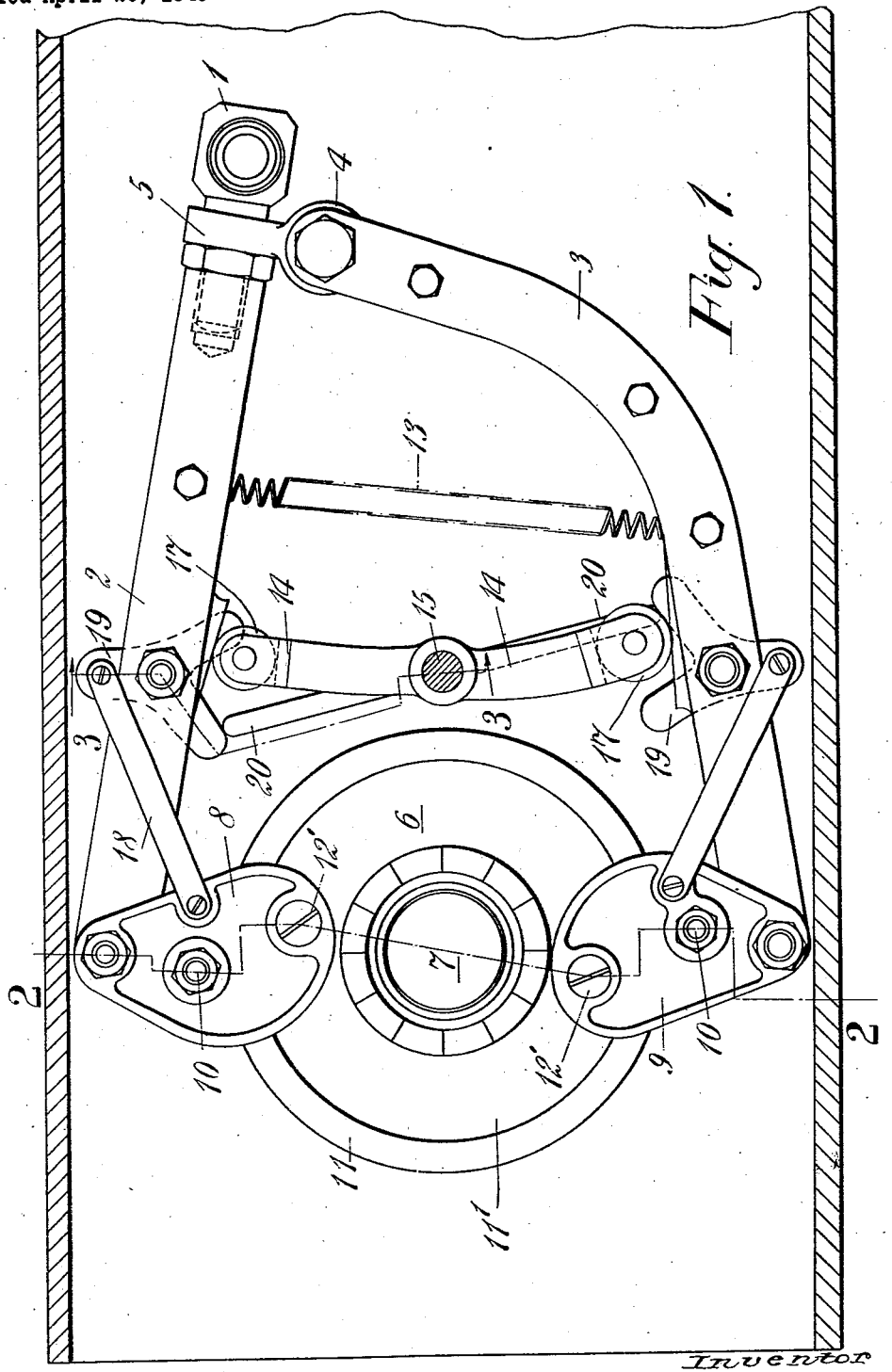
Figure 1 shows in side elevation one embodiment of the drive, equipped with two pairs of reciprocating arms, only one pair of which is shown.

In these drawings, 1 is a reciprocating member, which is rigidly secured to an upper arm or link 2, which therefore reciprocates with it. A lower reciprocating arm or link 3 is pivotally connected with an eye 4 on a collar 5 clamped between the link 2 and a shoulder on the member 1. The upper and lower links 2 and 3 diverge from this junction so as to pass above and below a drum 6, keyed to the driven shaft 7. An upper carrier 8 and a lower carrier 9 are pivotally mounted at the free ends of the links 2 and 3 respectively. On each carrier is mounted a roller 10 bearing upon the outer periphery of a flange 11, which is of T-shaped cross section (see Figure 2), at one end of the drum 6. On each carrier is also mounted, supported on screw pins 12', two rollers or like bearing members 12, capable of bearing against the inner periphery of the flange 11 on both sides of the web 11' of the T. A tension spring 13 is attached to the two links 2 and 3 so as to keep the outer rollers 10 of both upper and lower carriers 8 and 9 constantly pressed against the flange 11.

From Figure 1 it will be realised that the plane containing the axes of the bearing members 10 and 12 makes an angle with the plane containing the axis of the drum 6 and the axis of the roller 10, so that a slight movement of the carrier 8 about the pivot by which it is mounted on the link 2 will tend to bring the bearing member 12 nearer to or further from the flange 11. Thus when the reciprocating member moves from right to left it will tend to rock the upper carrier 8 in a counter-clockwise direction, thus pressing the inner bearing member 12 against the inner periphery of the flange, so that the flange is gripped between the outer and inner bearing members 10 and 12 and carried to the left, thus rotating the drum 6 and the shaft 7 in a counter-clockwise direction. At the same time the movement of the lower link 3 towards the left tends to rock the lower carrier 9 in a clockwise direction, thus disengaging the inner bearing member 12 of the lower carrier from the flange, and allowing the roller 10 of the lower carrier to roll idly over the outer periphery of the flange. When the reciprocating member is moving towards the right, the carriers 8 and 9 are rocked in the opposite directions, so that the bearing members of the lower carrier 9 grip the flange and draw it towards the right, while the inner bearing member 12 of the upper carrier is released, and the outer bearing member 10 of the upper carrier rolls idly upon the flange, the direction of rotation of the drum and shaft still being counter-clockwise.

Figure 2:
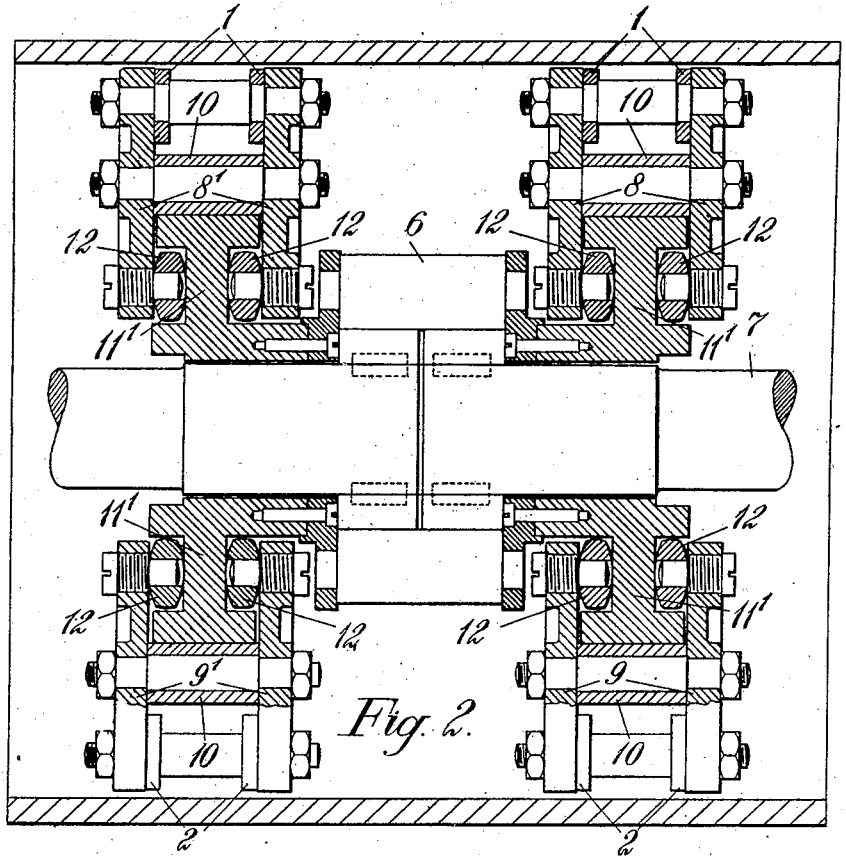
Figure 2 shows a view in cross section on the line 2—2 in Figure 1.

In Figure 2 the drum 6 is shown with two T-shaped flanges, one at each end, all the reciprocating parts being duplicated. By providing for a phase difference of ninety degrees between the reciprocation of the carriers 8 and 9 on one side and the corresponding carriers 8' and 9' on the other side, there will be no dead-centre position, thus facilitating starting and ensuring continuity of rotation and torque.

Figure 3:
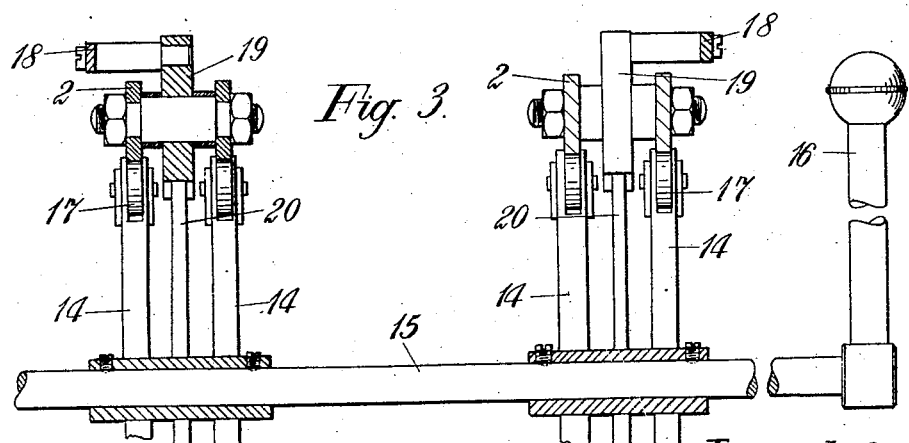
Figure 3 shows a view in cross section on the line 3—3 in Figure 1.

If it be desired to stop the rotation of the shaft 7 while the reciprocating motion of the member 1 continues, the rollers 10 may be lifted off the outer periphery of the flange without bringing the inner bearing members 12 into contact with the inner periphery by moving the links 2 and 3 slightly further apart against the pull of the spring 13. This may be effected as shown in Figures 1 to 3, by means of a lever 14, mounted fast on a shaft 15 passing between the links and perpendicular to the plane of the links, the shaft being rotated through the desired angle by means of a handle 16. Anti-friction rollers 17 may be mounted on the ends of the lever 14 to bear against the links 2 and 3, in order to minimise the frictional resistance between this lever and the links.

To enable the direction of rotation of the driven shaft 7 to be reversed, provision is made, as shown in Figures 1 to 3, for rocking the carriers 8 and 9 about the pivot by which they are connected to the links, thus throwing the plane containing the axes of the bearing members 10 and 12 over to the other side of the plane containing the axis of the drum 6 and the axis of the roller 12, so that the roller 12 will again be the leading bearing member, having regard to the direction of rotation of the drum. This rocking movement is imparted through rods 18 pivoted at one end to the carrier and at the other end to a three-armed lever or cam 19 pivotally mounted on the link.

A reversing lever 20, mounted on a shaft passing between the links and perpendicular to their plane, engages at each end between two arms of one of the three-armed levers (or in a V-shaped notch in one of the cams) so as to be able to oscillate these levers in either direction as required.

It would usually be desirable for an idle position to occur between the two positions for driving in opposite directions, and therefore the disengaging lever 14 and the reversing lever 20 may be mounted upon the same shaft 15, as shown, or combined into a single member, provided the parts are so designed that the release position will occur between the two driving positions.

When two or more flanged drums are mounted on the driven shaft, one control shaft 15 will carry the disengaging and reversing levers for all the reciprocating links.

Since the inner bearing members never have to roll on the flange they need not be constructed as rollers, though they may conveniently be cylindrical in form, and may advantageously be rotatable so as to bring different parts of the surface into operation from time to time in order that they may wear evenly all round.

The outer rollers will roll with little resistance in one direction and grip without slipping in the other, since the distance between the inner and outer rollers in the direction at right angles to the flange is in the first case greater than in the latter. The nature of the surfaces in contact is therefore important. These rollers may for instance be covered with india rubber, fibre or friction lining. It would be possible to provide teeth or serrations on the drum and rollers or other bearing members, to prevent slipping. This, however, is not generally necessary, and has not been shown in the drawings.

The clearance between the bearing members 12 and the inner periphery of the drum flange when disengaged may be extremely small, so that the drive will operate satisfactorily even with a very short stroke of the reciprocating member and a high rate or frequency of reciprocation.

If the driven shaft is vertical, the carriers will be one on each side instead of above and below. The construction will be the same.

I claim:

1. A drive comprising in combination a rotary driven member having an anular flange of T-shape cross-section, a reciprocable driving member, means for transmitting the driving power from the said reciprocable driving member to the said rotary driven member, the said means comprising a pair of divergent links connected at one end to the reciprocable driving member and extending to diametrically opposite sides of the rotary driven member, two carriers respectively pivotally connected to the other end of the divergent links, an outer bearing member mounted on each one of the two carriers for engagement with and right across the outer surface of the top part of the T-flange, and two inner bearing members mounted on the carriers for respective engagement with the two inner surfaces of the top part of the T-flange on either side of the vertical web of the T, the plane containing the axes of the outer and inner bearing members on each carrier making an angle with the plane containing the axis of the rotary driven member and the axis of the outer bearing member, and the one angle being in advance of and the other one lagging with respect to the said plane containing the axis of the rotary driven member, and resilient means for urging the divergent links towards each other and thereby pressing the outer bearing member against the annular flange, whereby the alternate to and fro movements of the two divergent links produced by the to and fro movements of the reciprocable driving member cause the two sets of bearing members mounted on the diametrically arranged carriers alternately to grip and release the annular flange and therewith the rotary driven member, and whereby the grip applied by the bearing members to the top part of the T-flange is equalised with respect to the vertical web of the T.

2. A drive comprising in combination a rotary driven member having an annular flange, a reciprocable driving member, means for transmitting the driving power from the said reciprocable driving member to the said rotary driven member, the said means comprising a pair of divergent links connected at one end to the reciprocable driving member and extending to diametrically opposite sides of the rotary driven member, two carriers respectively pivotally connected to the other end of the divergent links, and an outer and at least one inner bearing member mounted on each one of the two carriers for respective engagement with the outer and inner surface of the annular flange, the plane containing the axes of the outer and inner bearing members on each carrier making an angle with the plane containing the axis of the rotary driven member and the axis of the outer bearing member, and the one angle being in advance of and the other one lagging with respect to the said plane containing the axis of the rotary driven member, and resilient means for urging the divergent links towards each other and thereby pressing the outer bearing member against the annular flange, whereby the alternate to and fro movements of the two divergent links produced by the to and fro movements of the reciprocable driving member cause the two sets of bearing members mounted on the diametrically arranged carriers alternately to grip and release the annular flange and therewith the rotary driven member, and reversing means for rocking both carriers into a different position, in which the gripping and release produced by the thrust and pull of the reciprocating member are transposed as between the two carriers, the said reversing means comprising a cam on each diverging link, a link connecting the cam to the carrier, and a reversing lever pivoted on a shaft lying at right angles to the plane of the pair of diverging links and passing between them each end of the reversing lever co-operating with one of the cams.

3. A drive comprising in combination a rotary driven member having an annular flange, a reciprocable driving member, means for transmitting the driving power from the said reciprocable driving member to the said rotary driven member, the said means comprising a pair of divergent links connected at one end to the recriprocable driving member and extending to diametrically opposite sides of the rotary driven member, two carriers respectively pivotally connected to the other end of the divergent links, and an outer and at least one inner bearing member mounted on each one of the two carriers for respective engagement with the outer and inner surface of the annular flange, the plane containing the axes of the outer and inner bearing members on each carrier making an angle with the plane containing the axis of the rotary driven member and the axis of the outer bearing member, and the one angle being in advance of and the other one lagging with respect to the said plane containing the axis of the rotary driven member, and resilient means for urging the divergent links towards each other and thereby pressing the outer bearing member against the annular flange, whereby the alternate to and fro movements of the two divergent links produced by the to and fro movements of the reciprocable driving member cause the two sets of bearing members mounted on the diametrically arranged carriers alternately to grip and release the annular flange and therewith the rotary driven member and a stop lever pivoted on a shaft lying at right angles to the plane of the pair of diverging links and passing between them, and means for rocking the stop lever into a position in which its ends engage the two divergent links simultaneously to press them asunder against the action of the said resilient means, thereby inhibiting and gripping action.

DONALD MARCUS KELWAY MARENDAZ.

REFERENCES CITED

The following references are of record in the file of this patent:

UNITED STATES PATENTS

| Number | Name | Date |
| --- | --- | --- |
| 155,943 | Hamilton | Oct. 13, 1874 |
| 231,843 | Onderdonk | Aug. 31, 1880 |
| 251,733 | Bridenthal | Nov. 2, 1886 |
| 2,243,928 | Waterman | June 3, 1941 |
| 2,274,875 | Thompson | Mar. 3, 1942 |